United States Patent
Thakur et al.

(10) Patent No.: US 8,594,121 B2
(45) Date of Patent: Nov. 26, 2013

(54) COGNITIVE RADIO SPECTRUM SENSOR EMPLOYING PEAK-TO-AVERAGE RATIO AS THE SIGNAL FEATURE

(75) Inventors: Sushant Suresh Thakur, Sunnyvale, CA (US); SaiDhiraj Amuru, Blacksburg, VA (US); Sri Rama Chakravarthy Vollala, Andhra Pradesh (IN)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 13/213,684

(22) Filed: Aug. 19, 2011

(65) Prior Publication Data

US 2012/0269246 A1   Oct. 25, 2012

Related U.S. Application Data (60) Provisional application No. 61/477,254, filed on Apr. 20, 2011.

(51) Int. Cl.
*H04W 74/08* (2009.01)
*H04W 52/24* (2009.01)
*H04W 74/02* (2009.01)

(52) U.S. Cl.
USPC ........... 370/445; 370/252; 370/318; 370/332; 455/422.1

(58) Field of Classification Search
USPC .............. 370/252, 310.2, 318, 328–339, 349, 370/445; 455/13.4, 422.1, 522; 375/297
See application file for complete search history.

(56) References Cited

U.S. PATENT DOCUMENTS

| | | | |
|---|---|---|---|
| 5,956,638 A * | 9/1999 | Chang et al. .................. 455/423 |
| 7,751,996 B1 * | 7/2010 | Ardizzone et al. .............. 702/69 |
| 7,787,426 B2 | 8/2010 | Seidel et al. |
| 8,027,690 B2 | 9/2011 | Shellhammer |
| 2006/0227751 A1 * | 10/2006 | Theobold et al. ............. 370/338 |
| 2007/0263566 A1 * | 11/2007 | McHenry et al. ............. 370/329 |
| 2008/0068168 A1 * | 3/2008 | Tanaka ........................ 340/572.1 |
| 2008/0160931 A1 * | 7/2008 | Rofougaran ................. 455/90.3 |
| 2008/0198948 A1 | 8/2008 | Tang |
| 2008/0233946 A1 * | 9/2008 | Henry ......................... 455/422.1 |
| 2009/0017828 A1 * | 1/2009 | Lee et al. ...................... 455/446 |

(Continued)

FOREIGN PATENT DOCUMENTS

EP  2200244 A1  6/2010

OTHER PUBLICATIONS

"Evaluation of the Performance of Prototype TV-Band White Space Devices Phase II," OET Report FCC/OET 08-TR-1005, Technical Research Branch, Laboratory Division, Office of Engineering and Technology, Federal Communications Commission, Prepared by: Steven K. Jones, Thomas W. Phillips, Hugh L. Van Tuyl, Robert D. Weller, Oct. 15, 2008, 149 pages.

(Continued)

*Primary Examiner* — Hoon J Chung
(74) *Attorney, Agent, or Firm* — Jeffrey D. Jacobs (57) ABSTRACT

A white space sensing method includes measuring a peak to average power ratio (PAPR) of a signal of a channel in a spectrum band. The method also includes determining whether a ratio of the measured PAPR to a predetermined PAPR of a modulation scheme associated with the signal meets a predetermined threshold. The method further includes indicating the channel is available for use by an unlicensed user when the ratio meets the predetermined threshold.

18 Claims, 9 Drawing Sheets

(56) References Cited

U.S. PATENT DOCUMENTS

| | | |
|---|---|---|
| 2009/0052570 A1 | 2/2009 | Haykin |
| 2009/0196180 A1* | 8/2009 | Bahl et al. ............... 370/235 |
| 2009/0274103 A1* | 11/2009 | Yang et al. .............. 370/329 |
| 2009/0298522 A1 | 12/2009 | Chaudhri et al. |
| 2010/0075704 A1 | 3/2010 | McHenry et al. |
| 2011/0002405 A1* | 1/2011 | Raveendran ............. 375/260 |
| 2011/0028180 A1* | 2/2011 | Sawai ...................... 455/522 |
| 2011/0045781 A1* | 2/2011 | Shellhammer et al. ... 455/67.11 |
| 2011/0223877 A1* | 9/2011 | Tillman et al. ........... 455/226.2 |
| 2012/0147825 A1* | 6/2012 | Hassan et al. ............ 370/329 |
| 2012/0269080 A1* | 10/2012 | Giustiniano et al. ...... 370/252 |
| 2012/0269246 A1* | 10/2012 | Thakur et al. ............ 375/224 |

OTHER PUBLICATIONS

Meyer, et al., "Measuring the peak-to-average power of digitally modulated signals," Application Note AN-50, Apr. 1, 1993, 5 pages.

Percin, et al., "Calculation of Peak-to-Average Power Ratio in DVB-T," 47th International Symposium ELMAR, Jun. 8-10, 2005, Zadar, Croatia, pp. 205-207.

Rappaport, "Doppler Spread and Coherence Time," Wireless Communications: Principles and Practice (2nd Edition), Copyright 2002, http://zone.ni.com/devzone/cda/ph/p/id/334#toc0.

International Search Report and Written Opinion—PCT/US2012/034312—ISA/EPO—Jun. 14, 2012.

* cited by examiner

COGNITIVE RADIO SPECTRUM SENSOR EMPLOYING PEAK-TO-AVERAGE RATIO AS THE SIGNAL FEATURE

CROSS-REFERENCE TO RELATED APPLICATION

This application claims the benefit under 35 U.S.C. §119 (e) to U.S. Provisional Patent Application No. 61/477,254 entitled "Cognitive Radio Spectrum Sensor Employing Peak-To-Average Ratio as the Signal Feature," filed on Apr. 20, 2011, the disclosure of which is expressly incorporated by reference herein in its entirety.

TECHNICAL FIELD

The present disclosure relates, in general, to spectrum sensing in white space, and, more particularly, to a cognitive radio spectrum sensor employing peak-to-average ratio as the signal feature.

BACKGROUND

The Federal Communications Commission (FCC) is an independent agency of the United States government that is charged with regulating all non-federal government use of the radio spectrum (including radio and TV broadcasting), and all interstate telecommunications (wire, satellite and cable) as well as all international communications that originate or terminate in the United States. In 2010, the FCC finalized rules approving the unlicensed signal operation in the unused TV channels (i.e., white space). The new rules allow wireless technologies to use the TV white space as long as the technology and any resulting signal transmissions do not interfere with the existing primary users. For example, cognitive devices, such as white space devices, are allowed to use TV frequency bands if they do not cause harmful interference to TV receivers. Thus, cognitive radio demands a technology that can continuously sense the environment, dynamically identify unused spectral segments, and then operate in these white spaces without causing harmful interference to the incumbent users. Cognitive radio is a paradigm for wireless communication in which either a network or a wireless node changes its transmission or reception parameters to communicate efficiently avoiding interference with licensed or unlicensed users.

There are three types of primary signals: digital TV, which follows the ATSC format in North America; analog TV, which follows the NTSC format; and wireless microphones, which are narrowband (less than 200 kHz) signals with tunable operating frequency and generally use analog frequency modulation (FM). Other applicable signals include any applications that are entitled by regulations to use a specified portion of the spectrum. For purposes of this disclosure, the various devices that utilize such technologies to access this TV white space will be referred to as "white space devices," "unlicensed devices," "white space sensing devices," or the like.

White space devices with spectrum sensing capability generally operate in a cognitive manner in which the devices first scan to detect TV band signals from licensed primary users. The white space devices will then select unused channels in order to avoid interference with the licensed signals. Therefore, these white space devices generally share two common functions: (1) sensing for incumbent signals; and (2) selecting appropriate channels for interference avoidance.

The unprecedented radio agility envisioned, calls for fast and accurate spectrum sensing over a wide bandwidth, which challenges traditional spectral estimation methods typically operating at or above Nyquist rates. The radio front-end can employ a bank of tunable narrowband bandpass filters to search one narrow frequency band at a time. In each narrowband, existing spectrum sensing techniques perform either energy detection or feature detection. A major implementation challenge lies in the very high sampling rates of conventional spectral estimation methods, which have to operate at or above the Nyquist rate. Meanwhile, due to the timing employed for rapid sensing, only a limited number of measurements can be acquired from the received signal, which may not provide sufficient statistics when traditional linear signal reconstruction methods are employed.

Accordingly, it would be desirable to perform spectrum sensing of narrowband features in a wireless channel with less complexity in order to increase sensing performance.

SUMMARY

According to some aspects of the disclosure, a white space sensing method includes measuring a peak to average power ratio (PAPR) of a signal of a channel in a spectrum band. The method may also include determining whether a ratio of the measured PAPR to a predetermined PAPR of a modulation scheme associated with the signal meets a predetermined threshold. The method may also include indicating that the channel is available for use by an unlicensed user when the ratio meets the predetermined threshold.

According to some aspects of the disclosure, a white space sensing apparatus includes means for measuring a peak to average power ratio (PAPR) of a signal of a channel in a spectrum band. The apparatus may also include means for determining whether a ratio of the measured PAPR to a predetermined PAPR of a modulation scheme associated with the signal meets a predetermined threshold. The apparatus may also include means for indicating that the channel is available for use by an unlicensed user when the ratio meets the predetermined threshold.

According to some aspects of the disclosure, a white space sensing apparatus includes a memory and at least one processor coupled to the memory. The processor(s) is configured to measure a peak to average power ratio (PAPR) of a signal of a channel in a spectrum band. The processor(s) is further configured to determine whether a ratio of the measured PAPR to a predetermined PAPR of a modulation scheme associated with the signal meets a predetermined threshold. The processor(s) may also be configured to indicate that the channel is available for use by an unlicensed user when the ratio meets the predetermined threshold.

According to some aspects of the disclosure, a computer program product for wireless communications in a wireless network includes a computer-readable medium having non-transitory program code recorded thereon. The program code includes program code to measure a peak to average power ratio (PAPR) of a signal of a channel in a spectrum band. The program code also includes program code to determine whether a ratio of the measured PAPR to a predetermined PAPR of a modulation scheme associated with the signal meets a predetermined threshold. The program code may also include program code to indicate that the channel is available for use by an unlicensed user when the ratio meets the predetermined threshold.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present teachings, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
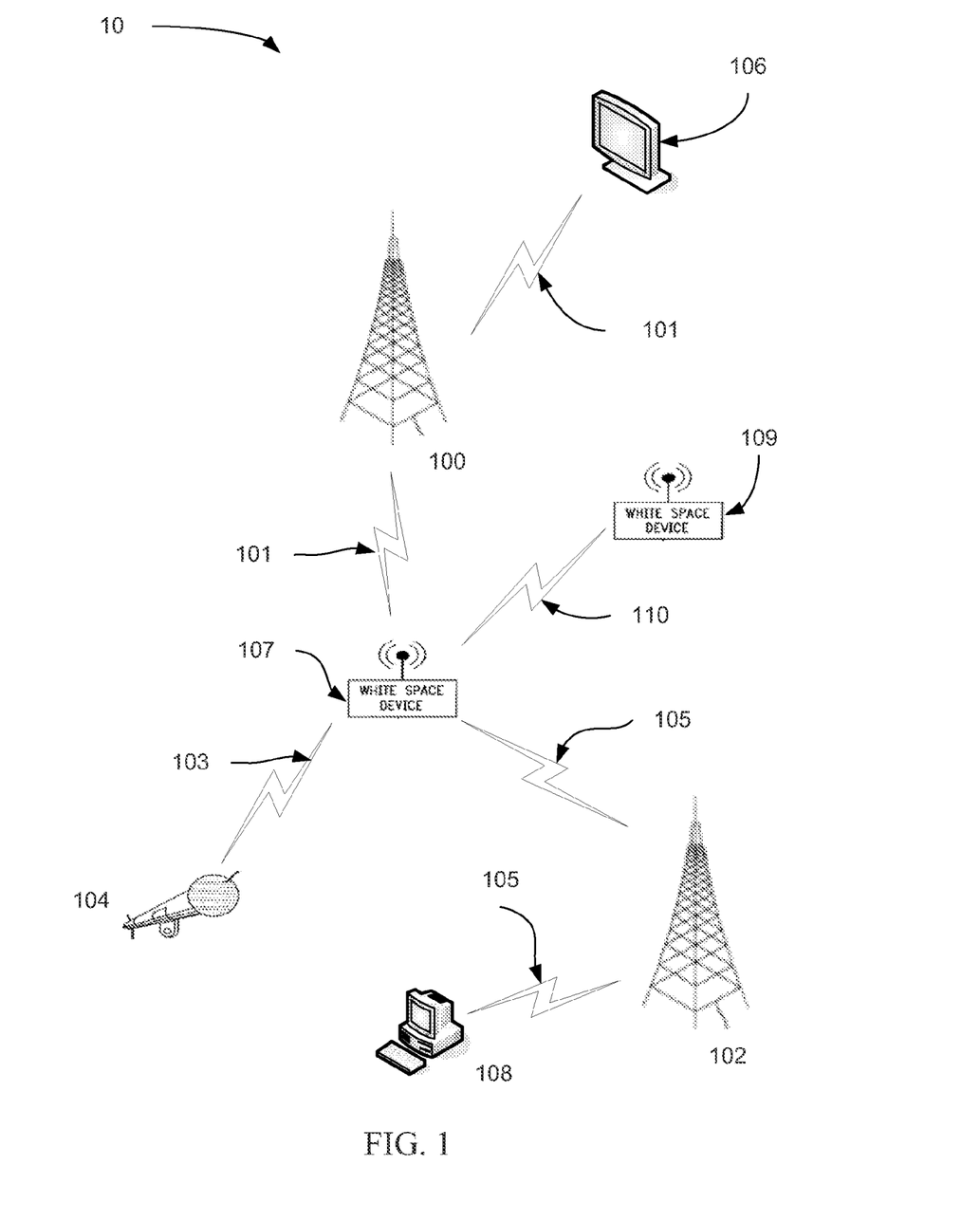
FIG. 1 is a block diagram illustrating an exemplary white space network in which an embodiment of the disclosure may be advantageously employed.

FIG. 1 is a block diagram conceptually illustrating a white space network 10 configured according to one embodiment of the present teachings. The white space network 10 may be a television white space network that includes certain television channel frequencies for use by certain wireless microphone systems. The white space network may include licensed ATSC signals 101 and licensed NTSC signals 105 that originate from primary users, such as TV broadcasters and the like. The TV white space network may also include a wireless microphone signal 103 generated by a wireless microphone 104, for example. The ATSC signal 101 and the NTSC signal 105 may be generated from an ATSC transmitter 100 and a NTSC transmitter 102, respectively. Many different devices 106 and 108, such as a TV tuner, a computer and the like, may use such licensed ATSC and NTSC signals 101 and 105. Each of the ATSC signals 101, the NTSC signals 105 and the wireless microphone signals 103 are licensed signals protected from interference by FCC regulations of various white space devices 107 or 109. In order to operate such white space devices 107 or 109 in the presence of licensed ATSC signals 101, NTSC signals 105 and wireless microphone signals 103, embodiments of the present disclosure provide for white space devices 107 or 109 to monitor the white space signals, such that white space devices 107 or 109 may distinguish between primary signals such as licensed ATSC signals 101, NTSC signals 105, wireless microphone signals 103, and secondary white space signals.

In some embodiments, the white space device 107 or 109 may be a device, such as devices 106 and 108, configured for white space sensing. For example, a white space device can be a laptop computer equipped with an ATSC or NTSC signal detector and internal wireless antenna, which configure the laptop computer for wirelessly transmitting and receiving white space signals. The user of a white space device 107, such as a laptop computer may have developed content that he or she intends to share over the TV white space network 10 with other white space devices, ATSC or NTSC devices, such as device 109. The white space device 107 begins by sensing the available spectrum in its vicinity, for example. It detects the ATSC, wireless microphone or NTSC signal 101, 103 or 105 and identifies these channel as off-limits for any unlicensed transmissions. The white space device 107 then generates a secondary white space signal 110 to other white space devices, ATSC or NTSC devices, such as device 109, using a white space channel that is currently unused by any licensed transmissions.

It should be noted that any type of information may be communicated between white space devices 107 and 109 individually or participating in a white space network 10. Examples of such information include sensing information, such as channel availability, location information, signal strength information, white space pilot frequency information, offset information, and the like. Moreover, cooperative sensing may be enabled through sharing of resources between different white space devices 107 and 109 within the white space network 10. For example, with reference to FIG. 1, the white space device 109 may not have the capability to determine location. By leveraging the white space network 10, the white space device 109 may query the other white space devices 107 for such location information. In response, the white space device 107 may transmit such location information to the white space device 109. As such, the white space device 109 may benefit from information obtained from devices having additional capabilities.

Figure 2:
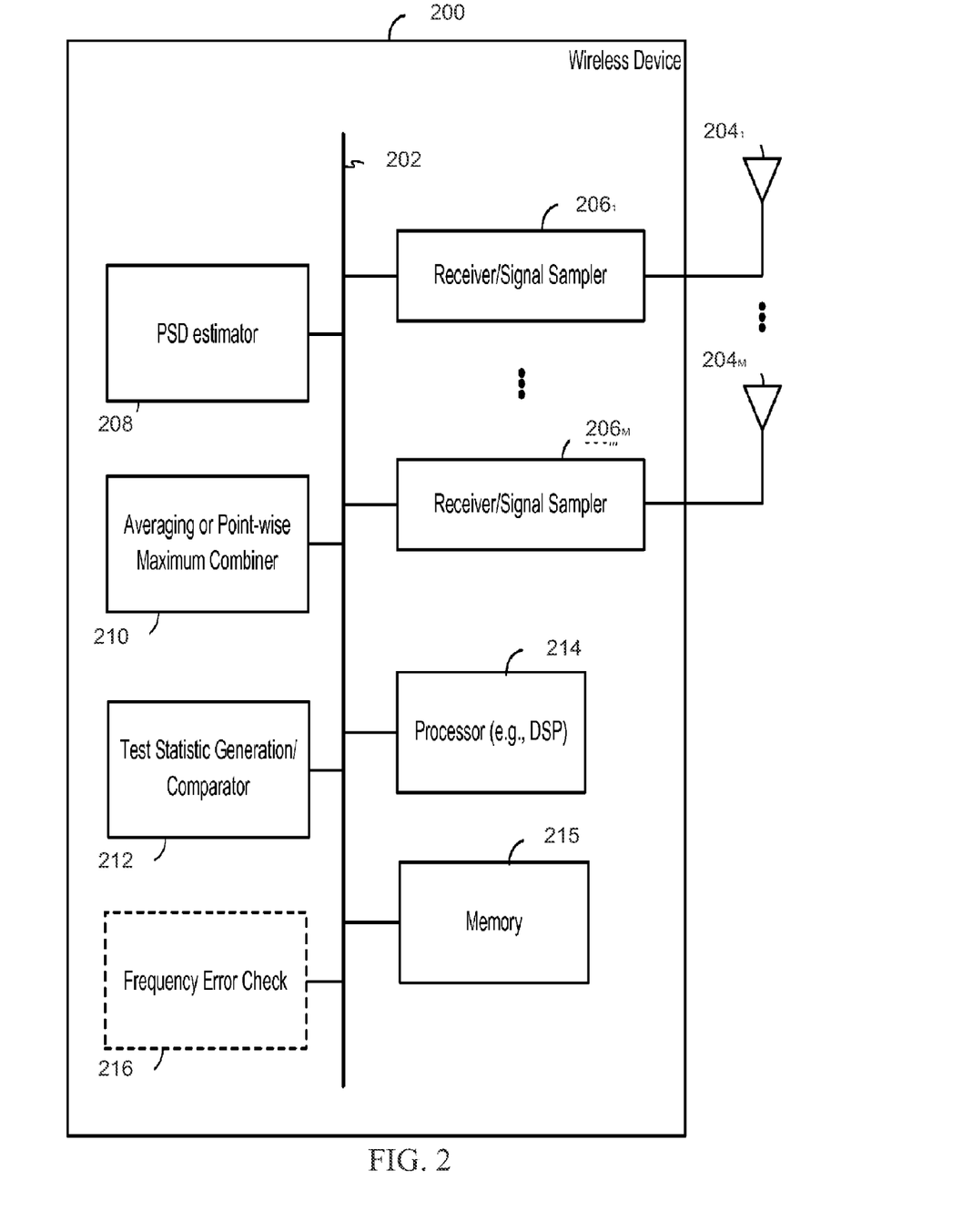
FIG. 2 illustrates an exemplary wireless device with spectrum sensing capability that may be used in the system of FIG. 1.

FIG. 2 illustrates an exemplary wireless device that may be used in the system of FIG. 1. It is noted that device 200 may be a receiver portion of a wireless device, which could be a user device 106, 108 or 109 in FIG. 1, a receiver portion of transmitters or base stations 100 and 102, or even simply a testing device (not shown herein). The device 200 includes a number of various functional modules for spectrum sensing of narrowband features (e.g., ATSC, NTSC, wireless microphones, or other licensed wireless transmissions) using spatial diversity. The various modules are shown communicatively coupled with a central data bus 202, or similar device for communicatively linking the several modules together.

The user device 200 includes multiple antennas $204_1$-$204_M$ with corresponding RF receiver circuitry and digital sampling circuitry $206_1$-$206_M$ to provide samples of the signal received by the respective antennas 204. The digital samples are communicated via the bus 202 to a PSD generator 208, which is configured to generate PSDs for each antenna.

The device 200 also includes an averaging or point-wise maximum combiner 210 configured to combine the PSDs determined by the generator 208 according to the methods disclosed previously. The combined PSD resulting from the combiner 210 is then used by a test statistic generator 212 to compute a test statistic according to either the maximum PSD, or a normalized strongest PSD component.

The generator 212 may also be configured to compare the generated test statistic to the predetermined threshold and thereby make the determination whether the narrowband signal features (e.g., a pilot signal) are present or not. Alternatively, the device 200 may include at least one processor 214 (e.g., a DSP) to perform any of the calculations or comparisons effected by any of blocks 208, 210, and 212. A memory 215 or other storage medium may associate with the processor 214 to store instructions or code executable by the processor. Additionally, an optional frequency error check unit 216 may be employed to perform an additional frequency check.

Figure 3:
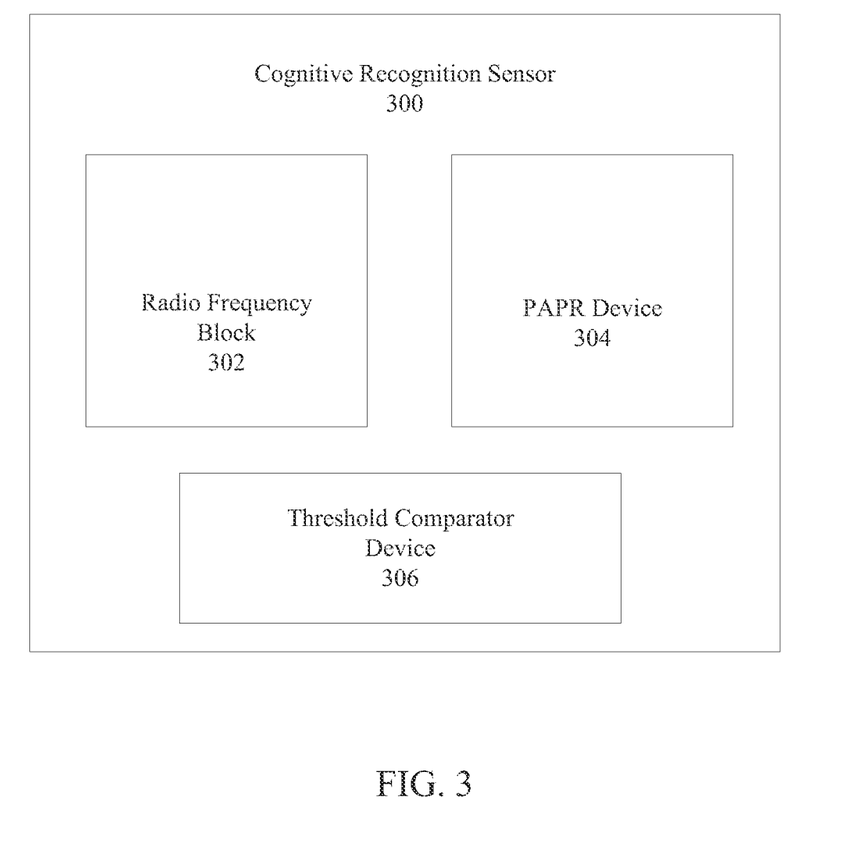
FIG. 3 illustrates an example of a cognitive recognition sensor according to some aspects of the disclosure.

FIG. 3 illustrates an example of a cognitive recognition sensor 300 according to some aspects of the disclosure. The cognitive recognition sensor 300 may include a radio frequency (RF) block 302, a peak to average power ratio (PAPR) device 304 (e.g., PAPR meter) and a threshold comparator device 306. The cognitive recognition sensor 300 may be associated with or implemented in conjunction with a receive chain or receiver of a wireless device, for example, wireless device 200 of FIG. 2. The cognitive recognition sensor 300 can enable the receiver to select a desired spectrum for reception. In some aspects of the disclosure, the receiver chain of a wireless device may include the RF block 302, an analog to digital converter (not shown) and a baseband processing unit (not shown). The baseband processing unit may incorporate the PAPR device 304 and the threshold comparator device 306. In some aspects of the disclosure, the PAPR device and the threshold comparator device 306 are independent of the baseband processing unit.

The RF block 302 may be configured to receive the signal of a channel in a spectrum band and to generate an output of the signal. The output is then forwarded or transmitted to the PAPR device 304. The PAPR device 304 may be configured to measure a peak to average power ratio (PAPR) or peak to average ratio (PAR) of the signal for a duration of time less than a coherent duration or channel coherent time. The coherent duration or channel coherent time may be a measure of an expected time duration for which channel response characteristics are essentially invariant. The output of the PAPR device 304 can be passed on to the threshold comparator device 306. The threshold comparator device 306 may involve thresholds that can be based on a desired modulation/spectrum to be sensed. For example, a WCDMA R99 quadrature phase shift keying (QPSK) waveform may have a PAPR of 7 dB while an additive white Gaussian noise may have a PAPR of 3 dB. An ATSC signal may have a PAPR of 6 dB. The threshold comparator device 306 may be programmable.

The threshold comparator device 306 may be configured to determine whether a ratio of the measured PAPR to a predetermined PAPR of a modulation scheme associated with a signal (e.g., RF signal) meets a predetermined threshold. The threshold comparator device 306 may be further configured to provide an indication of whether a spectrum band associated with the signal is available or unavailable for use by an unlicensed user based on whether the ratio meets the predetermined threshold. In some aspects of the disclosure, the indication may be generated or determined by a device (e.g., a processor or controller device) that is independent of the threshold comparator device 306. The processor or controller device may provide the indication based on results or determinations made at the threshold comparator device 306.

The cognitive recognition (CR) sensor 300 may be used for cognitive radio applications that employ reduced sampling rates. The cognitive recognition sensor 300 may apply peak to average power ratio or crest factor of a received waveform or signal to determine the modulation type present in a spectrum being sensed, e.g., ATSC. The CR sensor 300 can detect black and gray holes in a cognitive radio domain. Black space is a space in a spectrum that is not available for use by a white space device 107, for example. This may be because there is no room for another signal to coexist in the space. Gray space is a signal space in a spectrum, which is partially occupied so there is room for more signals to use the available spectrum. White space is defined as a signal space, which is completely unoccupied. Unregulated or unlicensed signals can be transmitted in this space.

Figure 4:
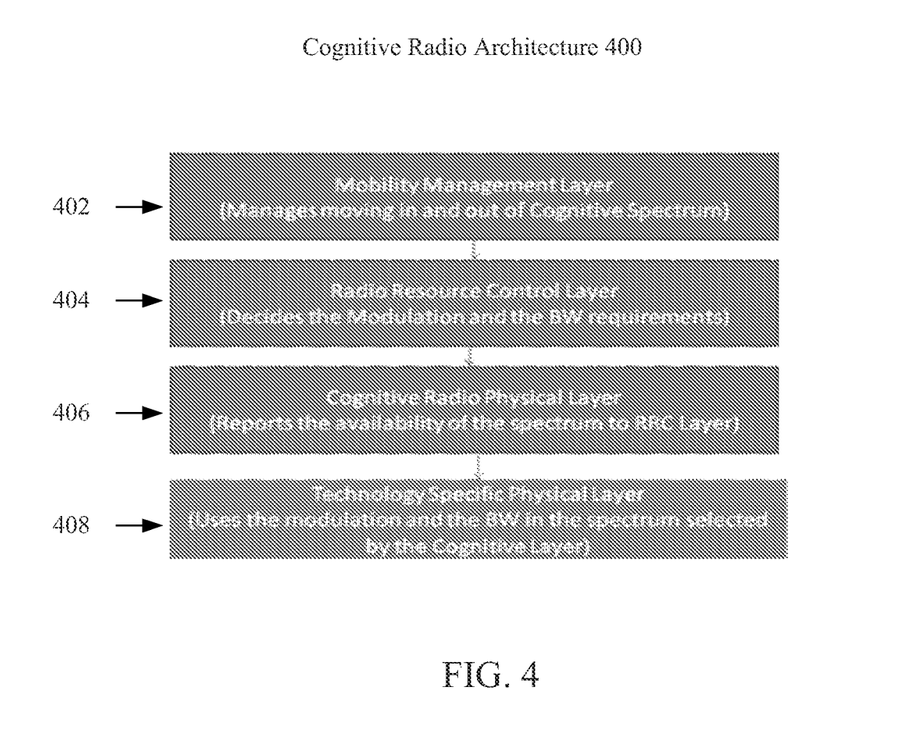
FIG. 4 illustrates an exemplary layer architecture of a cognitive radio sensor application.

FIG. 4 illustrates an exemplary layer architecture of a cognitive radio sensor. The cognitive radio or recognition architecture 400 may include a mobility management layer 402, a radio resource control layer 404, a cognitive radio physical layer 406 and a technology specific physical layer. The mobility management layer 402 may indicate when the cognitive recognition sensor can start sensing in a particular spectrum. The radio resource control layer 404 can decide the modulation techniques and the bandwidth (BW) for the cognitive recognition sensor to perform the sensing operations. The cognitive radio physical layer 406 can perform the acquisition of the spectrum and perform the PAPR calculations and reports to the upper layers on the availability of the spectrum for usage in a target application. Once the cognitive radio physical layer 406 indicates the availability of the spectrum, a target or technology specific physical layer 408 can implement the technology specific operations to use the sensed spectrum.

Figure 5:
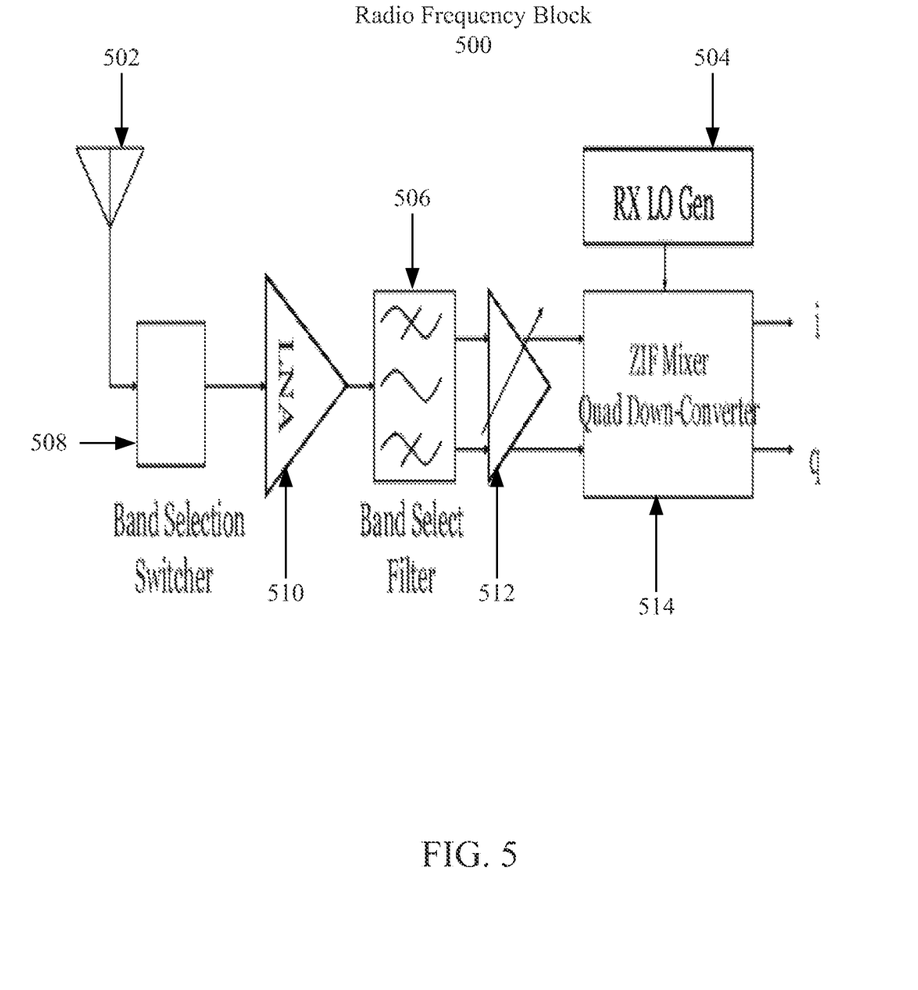
FIG. 5 illustrates an exemplary radio frequency block of the cognitive recognition sensor of FIG. 3.

FIG. 5 illustrates an exemplary radio frequency block 500 of the cognitive recognition sensor of FIG. 3. The radio frequency (RF) block 500 may be incorporated or implemented in the receive chain or receiver of a wireless device 200, for example. In general, the RF block tunes to the received spectrum and performs the automatic gain control on the received spectrum band and transmits a baseband output to an analog-to-digital converter (ADC). The radio frequency block 500 may include an antenna 502, a receiver local oscillator generator (RX LO Gen) 504, a band select filter 506 (e.g., a bandpass filter), band selection switcher 508, a low noise amplifier (LNA) 510, a variable gain amplifier 512 and a mixer 514 (e.g., a ZIF mixer quad down-converter).

The antenna 502 may receive radio frequency (RF) signals from one or more channels of one or more band spectrums. The band selection switcher 508 may be configured to receive the RF signals and to filter the RF signals from the antenna 502 for a desired frequency band or band spectrum. The RF signals associated with the desired frequency band or band spectrum can be passed through to the LNA 510 while other undesired signals are switched off or excluded.

The LNA 510 may receive and amplify the received RF signal with a gain and provide an amplified RF signal. The band select filter 506 may filter the signal from the LNA 510 to remove out-of-band signal components, for example, and provide an input RF signal to the variable gain amplifier 512. The band select filter 506 may be a bandpass filter such as a surface acoustic wave (SAW) filter, a ceramic filter, or some other type of filter. The variable gain amplifier 512 may amplify the RF signal received from the band select filter 506.

The mixer 514 may frequency downconvert the input RF signal from RF to baseband with an analog local oscillator (LO) signal from the LO generator 504. The LO generator 504 may include a voltage controlled oscillator (VCO), a phase locked loop (PLL), a reference oscillator, etc. The mixer 514 may provide the downconverted signal or analog baseband signal to a digital section (not shown).

Figure 6:
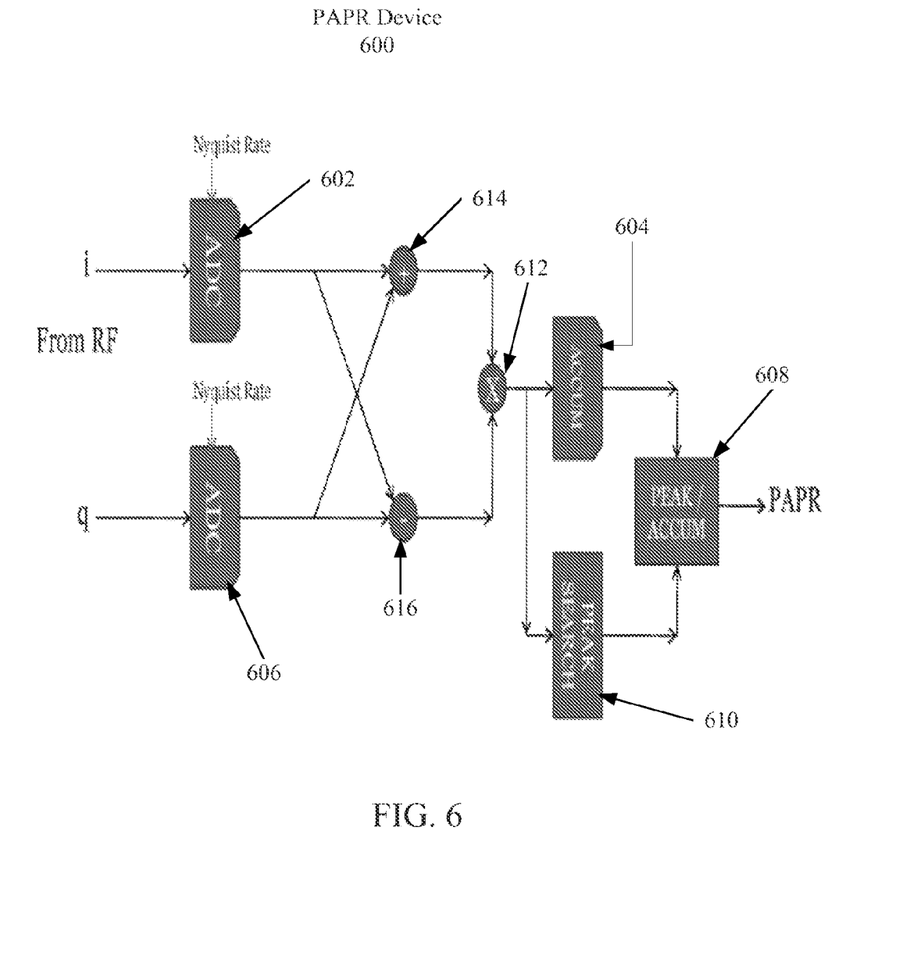
FIG. 6 illustrates an exemplary peak to average power ratio (PAPR) device of the cognitive recognition sensor of FIG. 3.

FIG. 6 illustrates an exemplary peak to average power ratio (PAPR) device 600 of the cognitive recognition sensor of FIG. 3. The PAPR device 600 may be similar to the PAPR device 304 of FIG. 3. The PAPR device 600 may be incorporated or implemented in the receive chain or receiver of a wireless device 200, for example. The downconverted signal or analog baseband signal may be received at a digital section of the receive chain that incorporates the PAPR device 600 or is associated with the PAPR device 609. The PAPR device 600 may include analog-to-digital converters (ADCs) 602 and 606, summers 614 and 616, a multiplier 612, a counter or accumulator 604, a peak search device 610 and a peak/accumulator processing device 608.

The ADCs 602, 606 may digitize the analog baseband signal at a sampling rate and provide one or more sample streams. In some aspects of the disclosure, the ADC 602 receives the in phase (I phase) of the analog signal from the mixer 514 and the ADC 606 receives the quadrature phase (Q phase) of the analog signal from the mixer 514. The outputs of the ADCs may be delivered to be combined in summers 614 and 616. The summer 616 may subtract the output of ADC 602 from the output of the ADC 606. The summer 614 may add the output of the ADC 606 to the output of the ADC 602. The multiplier 612 multiplies the output of the summers 614 and 616 and generates an output of the signal to the accumulator 604 and the peak search device 610. The peak search device 610 may be configured to collect or calculate a peak power value (e.g., in dB) of the signals received over a duration of time less than a coherent duration.

The accumulator 604 may be configured to accumulate a power value (e.g., in dB) of the received signals collected over a duration of time less than a coherent duration and to calculate the average power value (e.g., in dB) of the accumulated signals. The peak/accumulator processing device 608 may be configured to receive the peak signal power value from the peak search device 610 and to receive the average signal power value from the accumulator 604. The peak/accumulator processing device 608 may be further configured to calculate the peak to average power ratio of the received signals based on the outputs received from the peak search device 610 and the accumulator 604.

In some aspects of the disclosure, the calculated PAPR may be forwarded to the threshold comparator device 306 of FIG. 3, where it can be determined whether a ratio of the measured or calculated PAPR to a predetermined PAPR of the modulation scheme associated with the received signal meets a predetermined threshold. In some aspects of the disclosure, an RF or receiver chain in which the RF block 500 and the PAPR device is implemented may be implemented in a high gain stage for decoding and calculating the PAPR. In order to reduce saturation effects on the ADCs 602 and 606, the I and the Q data may be such that they are substantially free from direct current components. In some aspects of the disclosure, a low IF filter may be implemented in conjunction with the cognitive recognition sensor 300.

Figure 7:
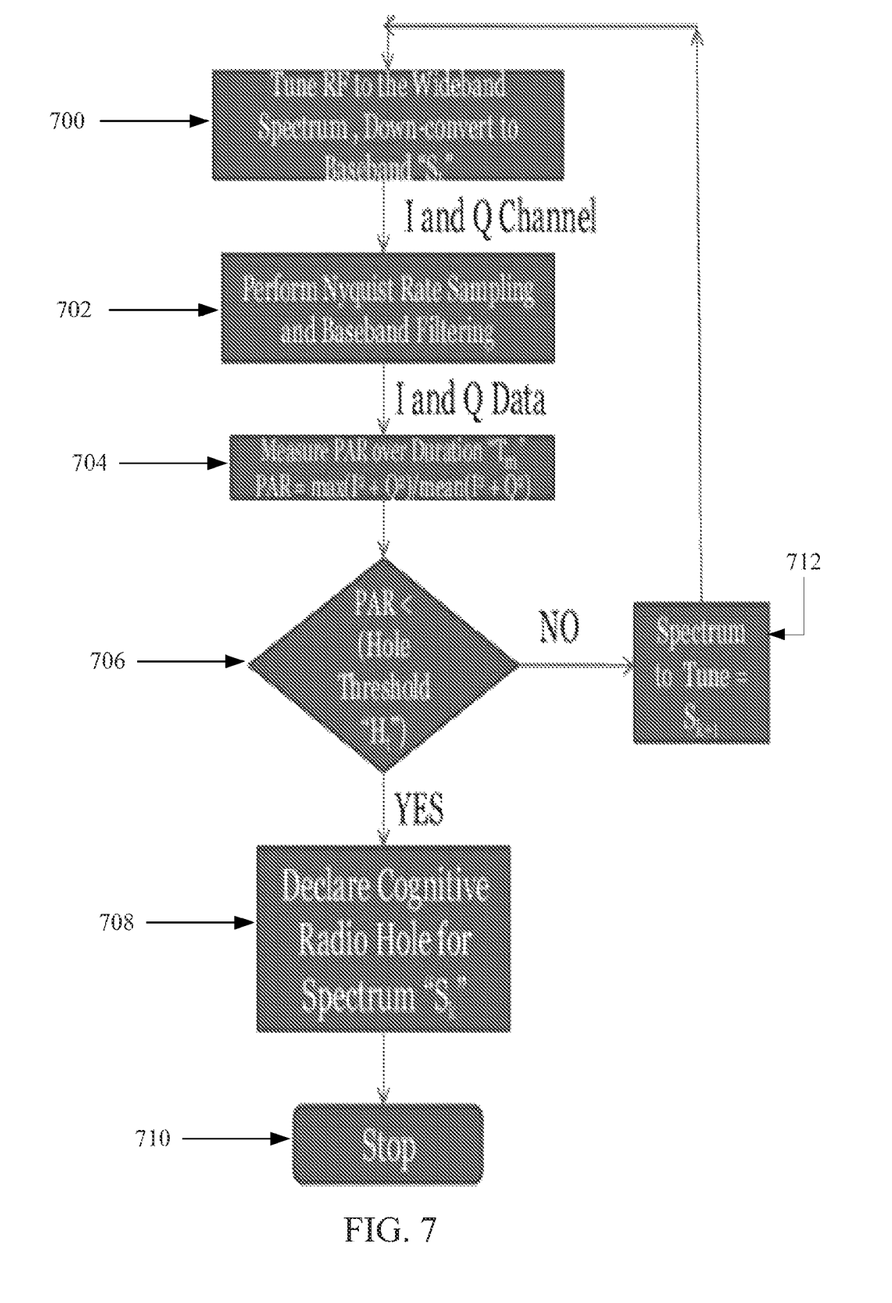
FIG. 7 illustrates a flowchart of an exemplary operation of the cognitive recognition sensor using PAPR as signal feature.

FIG. 7 illustrates a flowchart of an operation of the cognitive recognition sensor using PAPR as the signal feature. The process starts at block 700 where the RF block tunes to and down converts the received channel to a baseband signals $S_K$. At block 702, the baseband signals $S_K$ undergo sampling and baseband filtering. In some aspects of the disclosure, the sampling includes Nyquist rate sampling. At block 704, the sampled I-Q signals are passed on or transmitted to the PAPR device 600, which measures or calculates the PAPR of the signals. The PAPR may be measured over a time period $T_M$, where $T_M$ may be selected based on the technology of choice (e.g., ATSC). In some aspects of the disclosure, $T_M$ may be the duration over which the I phase and the Q phase samples are captured or collected. $T_M$ can be selected such that the PAR measured or calculated over the $T_M$ duration is stable. $T_M$ can be chosen as ½ $T_C$, where $T_C$ can be the coherence time of the technology (e.g., ATSC) in use. The I and Q samples are then squared, summed and averaged to calculate. For example, PAPR or PAR may be calculated as PAR=max($I^2+Q^2$)/mean ($I^2+Q^2$), where max is the indicates the peak power and mean indicates the average power of the received signals.

The output of the PAPR device 600 may be passed on to the threshold comparator device 306 at block 706. The threshold comparator device 306 threshold ($H_t$), can be configured based on the desired modulation/spectrum of a technology (e.g. ATSC) to be sensed. $H_t$ may depict the PAPR of a desired technology, in dB, as measured over the air in typical loading conditions, for example. At block 706, it can be determined whether the calculated PAPR is less than $H_t$. If the calculated PAPR is less than $H_t$ the process continues to block 708 where it is declared that a cognitive radio hole is available for the received channels $S_K$ after which the process ends at block 710. If the calculated PAPR is not less than $H_t$ the process continues to block 712 where the next channel $S_{K+1}$ of the spectrum band is tuned and the process starts over at block 700 with the next channel $S_{K+1}$.

Coherence or coherent time can be a statistical measure of the time duration over which a channel impulse response is essentially invariant, and quantifies the similarity of the channel response at different times. In other words, coherence time can be the time duration over which two received signals have a strong potential for amplitude correlation.

Tm can be chosen as ½ Tc where Tc is the coherence time of the particular technology (e.g., ATSC) in use. For example in the case of ATSC spectrum, the Tc when the mobile/UE is transmitting at 100 mph is 3.5 ms.

The ATSC spectrum ranges from 54 MHz to 870 MHz. Thus, the Doppler spread for 870 MHz is 870*100 mph/c=128.88 Hz, where c is the velocity of light for a speed of 100 mph Tc=0.423/Fd=3.28 ms. Hence in the case of ATSC spectrum sensing using the cognitive radio sensor proposed herein, Tm=½ Tc=1.64 ms to calculate the PAPR of the ATSC signal, for example.

Figure 8:
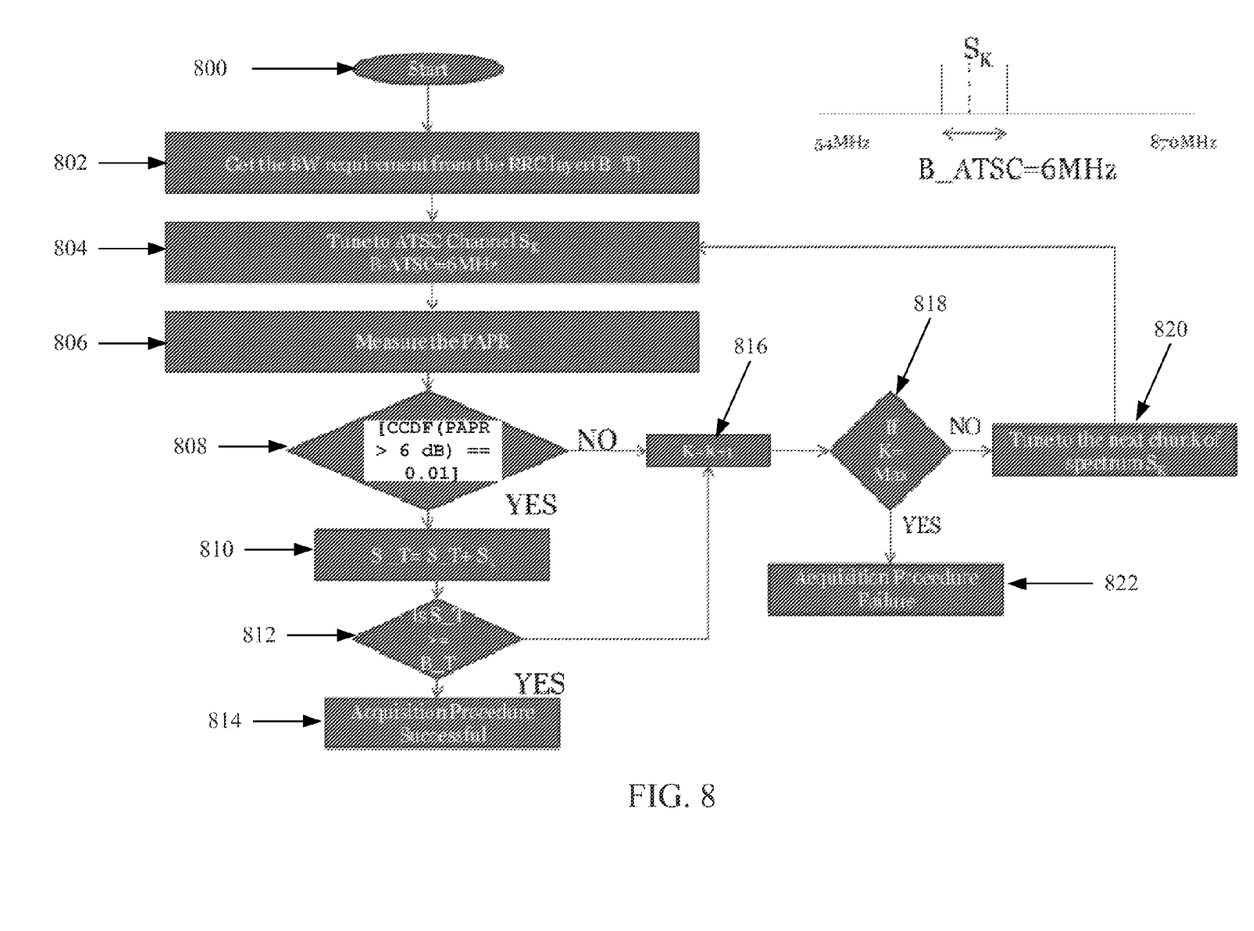
FIG. 8 illustrates a flowchart of an exemplary cognitive radio signal acquisition procedure.

FIG. 8 illustrates a flowchart of an exemplary cognitive radio signal acquisition procedure. In some multicarrier implementations, a technology, for example, long term evolution (LTE), may desire use of a particular amount of spectrum, S_T, in white space. For example, the desired bandwidth B_T may be 20 MHz, which is more than the bandwidth of a single ATSC channel. The cognitive radio signal acquisition procedure may adopt an accumulation process that includes tuning to multiple channels $S_k$ in a spectrum and finding the desired bandwidth in more than one channel in the ATSC spectrum. In some aspects of the disclosure, a complementary cumulative distribution function (CCDF) of the PAPR can be adopted to determine whether a channel is available for transmission by a white space device.

Referring to the flowchart, the process starts at block 800. At block, 802 a bandwidth requirement is obtained from the RRC layer. At block 804, a white space device tunes to a predefined portion of an ATSC spectrum as indicated by upper layers and searches for "holes" or unused spectrum. In the example of FIG. 8, the ATSC spectrum ranges from 54 MHz to 870 MHz. In order to check for available frequencies in this spectrum range, it is desirable to tune to portions of spectrum with a bandwidth of, for example 6 MHz (B-ATSC), and accumulate the available unused portions in this spectrum range until the desired bandwidth, B_T (e.g., 20 MHz) is achieved.

At block 806, the PAPR of the tuned ATSC channel is measured. At block 808, it is determined whether the PAPR meets a threshold value. For example, the complementary cumulative distribution function is analyzed. If the CCDF does not meet the threshold value, the process continues to block 816 where a counter representing the current portion of spectrum adds a value (e.g., 1) to its current value that represents the next chunk of spectrum. At block 818, it is determined whether the counter value is at a maximum. If the counter value is at a maximum, the process continues to block 822 where it is indicated that the acquisition procedure failed. Otherwise, at block 820, the white space device tunes to the next chunk of spectrum and the process returns to block 804.

If the CCDF meets the threshold value at block 808, the process continues to block 810 where the chunks of spectrums are accumulated or summed. At block 812, it is determined whether the sum of the spectrums is greater than the desired bandwidth, B_T. If the sum is less than the desired bandwidth, B_T, the process continues to block 816 to attempt to locate additional bandwidth. If the accumulated bandwidth is enough (i.e., as much as desired), the process continues to block 814 where the acquisition procedure is declared successful.

Figure 9:
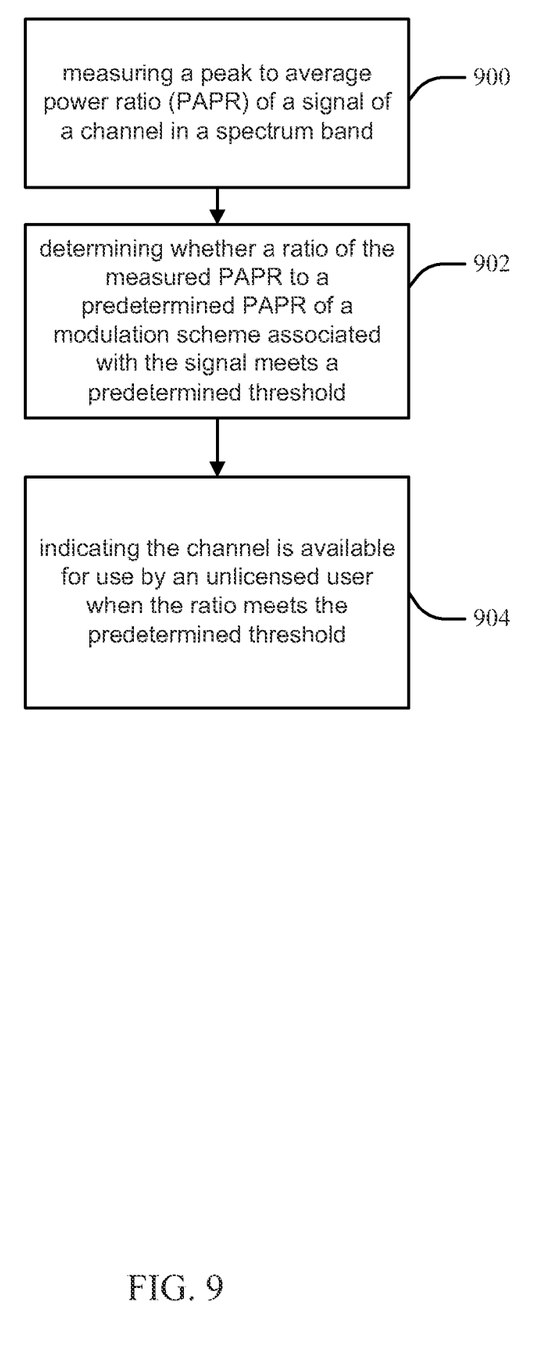
FIG. 9 illustrates a method of wireless communication in white space according to an embodiment of the disclosure.

FIG. 9 illustrates a method of wireless communication in white space according to an embodiment of the disclosure. At block 900, the method starts with measuring a peak to average power ratio (PAPR) of a signal of a channel in a spectrum band. At block 902, the method includes determining whether a ratio of the measured PAPR to a predetermined PAPR of a modulation scheme associated with the signal meets a predetermined threshold. At block 904, the method includes indicating the channel is available for use by an unlicensed user when the ratio meets the predetermined threshold.

In one configuration, the white space device 107 or a cognitive recognition sensor 300 is configured for white space sensing including means for measuring a peak to average power ratio (PAPR) of a signal of a channel in a spectrum band. In one aspect of the disclosure, the measuring means may be the PAPR device 304, a baseband processing unit (not shown), a processor 214 and/or a memory 215 configured to perform the functions recited by the measuring means. The white space device 107 or a cognitive recognition sensor 300 is also configured to include a means for determining whether a ratio of the measured PAPR to a predetermined PAPR of a modulation scheme associated with the signal meets a predetermined threshold. In one aspect of the disclosure, the determining means may be the threshold comparator device 306, a processor 214 and/or a memory 215 configured to perform the functions recited by the determining means. The white space device 107 or a cognitive recognition sensor 300 is also configured to include a means for indicating that the channel is available for use by an unlicensed user when the ratio meets the predetermined threshold. In one aspect, the indicating means may be the threshold comparator device 306, a processor 214 and/or a memory 215 configured to perform the functions recited by the indicating means. In another aspect, the aforementioned means may be a module or any apparatus configured to perform the functions recited by the aforementioned means.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein, the term "memory" refers to any type of long term, short term, volatile, nonvolatile, or other memory and is not to be limited to any particular type of memory or number of memories, or type of media upon which memory is stored.

The machine or computer readable medium that stores the software code defining the methodologies and functions described herein includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A white space sensing method, comprising:
   measuring a peak to average power ratio (PAPR) of a signal of a channel in a spectrum band;
   determining whether a ratio of the measured PAPR to a predetermined PAPR of a modulation scheme associated with the signal meets a predetermined threshold; and
   indicating that the channel is available for use by an unlicensed user when the ratio meets the predetermined threshold.

2. The method of claim 1, further comprising:
   tuning to a next channel of the spectrum band when the ratio does not meet the predetermined threshold and repeating the measuring, determining, and indicating.

3. The method of claim 1, further comprising reducing the predetermined PAPR of the modulation scheme associated with the signal to a reduced value when the ratio related to each channel of a predetermined number of subsequent channels does not meet the predetermined threshold.

4. The method of claim 1, in which the measuring is for a duration of time less than a coherent duration associated with an incumbent technology.

5. The method of claim 4, in which the duration of time comprises half of the coherent duration associated with the incumbent technology.

6. The method of claim 4, in which the incumbent technology comprises one of ATSC and NTSC.

7. The method of claim 1, further comprising tuning to a subsequent channel of the spectrum band when the ratio meets the predetermined threshold and a current channel bandwidth is smaller than a bandwidth desired by the unlicensed user and repeating the measuring, determining, and indicating.

8. The method of claim 7, further comprising accumulating the current channel bandwidth and at least one subsequent channel bandwidth when it is determined that the current channel bandwidth and the at least one subsequent channel bandwidth are available, the accumulating of the current channel bandwidth and the at least one subsequent channel bandwidth continuing until the bandwidth desired by the unlicensed user is accumulated.

9. An apparatus for white space sensing, comprising:
   means for measuring a peak to average power ratio (PAPR) of a signal of a channel in a spectrum band;
   means for determining whether a ratio of the measured PAPR to a predetermined PAPR of a modulation scheme associated with the signal meets a predetermined threshold; and
   means for indicating that the channel is available for use by an unlicensed user when the ratio meets the predetermined threshold.

10. An apparatus for white space sensing, comprising:
    a memory; and
    at least one processor coupled to the memory and configured:
      to measure a peak to average power ratio (PAPR) of a signal of a channel in a spectrum band;
      to determine whether a ratio of the measured PAPR to a predetermined PAPR of a modulation scheme associated with the signal meets a predetermined threshold; and
      to indicate that the channel is available for use by an unlicensed user when the ratio meets the predetermined threshold.

11. The apparatus of claim 10, in which the processor is further configured to tune to a next channel of the spectrum band when the ratio does not meet the predetermined threshold and to repeatedly measure, determine, and indicate.

12. The apparatus of claim 10, in which the processor is further configured to: reduce the predetermined PAPR of the modulation scheme associated with the signal to a reduced value when the ratio related to each channel of a predetermined number of subsequent channels does not meet the predetermined threshold.

13. The apparatus of claim 10, in which the processor is further configured to measure for a duration of time less than a coherent duration associated with an incumbent technology.

14. The apparatus of claim 13, in which the duration of time comprises half of the coherent duration associated with the incumbent technology.

15. The apparatus of claim 13, in which the incumbent technology comprises one of ATSC and NTSC.

16. The apparatus of claim 10, in which the processor is further configured to: tune to a subsequent channel of the spectrum band when the ratio meets the predetermined threshold and a current channel bandwidth is smaller than a bandwidth desired by the unlicensed user and to repeatedly measure, determine, and indicate.

17. The apparatus of claim 16, in which the processor is further configured to accumulate the current channel bandwidth and at least one subsequent channel bandwidth when it is determined that the current channel bandwidth and the at least one subsequent channel bandwidth are available, until the bandwidth desired by the unlicensed user is accumulated.

18. A computer program product for wireless communications in a wireless network, comprising:
    a computer-readable medium having non-transitory program code recorded thereon, the program code comprising:
      program code to measure a peak to average power ratio (PAPR) of a signal of a channel in a spectrum band;
      program code to determine whether a ratio of the measured PAPR to a predetermined PAPR of a modulation scheme associated with the signal meets a predetermined threshold; and
      program code to indicate that the channel is available for use by an unlicensed user when the ratio meets the predetermined threshold.

* * * * *